(12) United States Patent
Yeniay

(10) Patent No.: US 6,781,748 B2
(45) Date of Patent: Aug. 24, 2004

(54) LONG WAVELENGTH OPTICAL AMPLIFIER

(75) Inventor: Aydin Yeniay, Strafford, PA (US)

(73) Assignee: Photon-X, LLC, Malvern, PA (US)

( * ) Notice: Subject to any disclaimer, the term of this patent is extended or adjusted under 35 U.S.C. 154(b) by 0 days.

(21) Appl. No.: 10/255,981

(22) Filed: Sep. 26, 2002

(65) Prior Publication Data

US 2003/0063372 A1 Apr. 3, 2003

Related U.S. Application Data

(60) Provisional application No. 60/325,641, filed on Sep. 28, 2001.

(51) Int. Cl.[7] .............................................. H01S 3/00
(52) U.S. Cl. ................................................... 359/341.1
(58) Field of Search ............................ 359/341.1, 341.3

(56) References Cited

U.S. PATENT DOCUMENTS

| | | |
|---|---|---|
| 4,938,556 A | 7/1990 | Digonnet et al. |
| 5,050,949 A | 9/1991 | DiGiovanni et al. |
| 5,119,230 A | 6/1992 | Pfeiffer |
| 5,268,910 A | 12/1993 | Huber |
| 5,361,161 A | 11/1994 | Baney et al. |
| 5,497,265 A | 3/1996 | Fontana et al. |
| 5,506,724 A | 4/1996 | Shimizu et al. |
| 5,623,362 A | 4/1997 | Mitsuda et al. |
| 5,623,508 A | 4/1997 | Grubb et al. |
| 5,673,280 A | 9/1997 | Grubb et al. |
| 5,712,715 A | 1/1998 | Erdogan et al. |
| 5,790,300 A | 8/1998 | Zediker et al. |
| 5,808,786 A | 9/1998 | Shibuya |
| 5,867,306 A | 2/1999 | Isshiki |
| 5,917,648 A | 6/1999 | Harker |
| 5,963,361 A | 10/1999 | Taylor et al. |
| 6,049,417 A | 4/2000 | Srivastava et al. |
| 6,049,418 A | 4/2000 | Srivastava et al. |
| 6,104,528 A | 8/2000 | Hwang |

(List continued on next page.)

FOREIGN PATENT DOCUMENTS

| | | |
|---|---|---|
| EP | 779687 A2 | 6/1997 |
| EP | 0954070 A2 | 4/1999 |
| EP | 954070 A2 | 11/1999 |
| EP | 1073166 A2 | 7/2000 |
| GB | 2340297 A | 8/1999 |
| JP | 2002252399 A * | 9/2002 |

OTHER PUBLICATIONS

Bumki, Min, "Performance Improvement of Wideband EDFA by ASE Injection from C Band to L Band Amplifier", Fifth Asia–Pacific Conference on Communications and Fourth Optoelectronics and Communications Conference. APCC/OECC'99. Proceedings. Conference—Vitality to the New Century (IEEE Cat. No. 99EX379), Pt. vol. 2, pp. 1346–1347 vol. 2, Published: Beijing, China, 1999. Beijing Univ. Posts & Telecommun.

(List continued on next page.)

Primary Examiner—Mark Hellner
(74) Attorney, Agent, or Firm—Joseph E. Maenner; Monte & McGraw, P.C.

(57) ABSTRACT

An L band optical amplifier in disclosed. The amplifier includes a signal line for transmitting a signal light in a first direction. The signal line includes an input, an output disposed optically downstream of the input, and a first amplifying gain medium optically disposed between the input and the output. A first laser is optically aligned with the first amplifying gain medium to transmit a first pump light to the first amplifying gain medium toward the output. A first reflector is disposed along the signal line between the first amplifying gain medium and the output to reflect a first bandwidth of light from the first amplifying gain medium back into the first amplifying gain medium. A second laser is optically aligned with the first amplifying gain medium to transmit a second pump light to the first amplifying gain medium toward the input. A second is reflector disposed along the signal line between the first amplifying gain medium and the input to reflect a second bandwidth of light, different from the first bandwidth of light, from the first amplifying gain medium back into the first amplifying gain medium.

23 Claims, 6 Drawing Sheets

U.S. PATENT DOCUMENTS

| | | | |
|---|---|---|---|
| 6,115,174 | A | 9/2000 | Grubb et al. |
| 6,141,142 | A | 10/2000 | Espindola et al. |
| 6,201,637 | B1 | 3/2001 | Nilsson et al. |
| 6,222,670 | B1 | 4/2001 | Ryu et al. |
| 6,233,092 | B1 | 5/2001 | Flood et al. |
| 6,288,834 | B1 * | 9/2001 | Sugaya et al. ............ 359/341.1 |
| 6,297,903 | B1 | 10/2001 | Grubb et al. |
| 6,317,254 | B1 | 11/2001 | Park et al. |
| 6,381,063 | B1 | 4/2002 | Liu |
| 6,507,429 | B1 * | 1/2003 | Ales et al. ................ 359/341.1 |
| 6,674,570 | B2 * | 1/2004 | Song et al. .................. 359/349 |
| 2002/0003655 | A1 | 1/2002 | Park et al. |
| 2002/0118444 | A1 | 8/2002 | Yeniay |
| 2002/0118445 | A1 | 8/2002 | Yeniay |

OTHER PUBLICATIONS

Lee et al., "Enhancement of Power Conversion Efficiency for an L–Band EDFA with a Secondary Pumping Effect in the Unpumped EDF Section", IEEE Photonics Technology Letters, vol. II, No. 1, Jan. 1999, pp. 42–44.

Lee et al., "Passive erbium–doped fiber seed photon generator for high–power $Er^{3+}$–doped fiber fluorescent sources with an 80–nm bandwidth", Optics Letters, vol. 24, No. 5, Mar. 1, 1999, pp. 279–281.

Chung, et al., "Low noise, high efficiency L–band EDFA with 980 nm pumping", Electronics Letters Online, No. 19990750, DOI: 10.1049/el:19990750, Apr. 19, 1999.

Shigematsu et al., "A Novel Configuration of L–Band Erbium–Doped Fiber Amplifier for Improved Efficiency", ECOC '99, Sep. 26–30, 1999, Nice, France, pp. I–270–I–271.

Mahdi et al., "Simultaneous Bi–directional of C– and L–Band Erbium Doped Fiber Amplifier", OFC 2000, Mar. 2000, Baltimore, MD, pp. TuA3–2–TuA3–5.

Buxens et al., "Gain Flattened L–band EDFA based on upgraded C–band EDFA using forward ASE pumping in an EDF section", Electronics Letters, vol. 36, No. 9, Apr. 27, 2000, pp. 821–823.

Min et al., "Coupled Structure for Wide–Band EDFA with Gain and Noise Figure Improvements from C to L–Band ASE Injection", IEEE Photonics Technology Letters, vol. 12, No. 5, May 2000, pp. 480–482.

Pratt et al., "Gain Control in L–Band EDFAs by Monitoring Backward Travelling C–Band ASE", IEEE Photonics Technology Letters, vol. 12, No. 8, Aug. 2000, pp. 983–985.

Adikan et al., "A Study of Gain and Noise Figure Performance of an L–Band Erbium Doped Fibre Amplifier (EDFA) with 980 nm and Amplified Spontaneous Emission (ASE) Pumps", TENCON 2000, Intelligent Syst & Technologies for the New Millennium, Kuala Lampur, Malaysia, Sep. 2000, pp. III–417–III–420.

Flood, "Gain Saturation Behavior in L–Band EDFAs", IEEE Photonics Technology Letters, vol. 12, No. 9, Sep. 2000, pp. 1156–1158.

Mahdi et al., "High–Gain Bidirectional $Er^{3+}$–Doped Fiber Amplifier for Conventional–and Long–Wavelength Bands", IEEE Photonics Technology Letters, vol. 12, No. 11, Nov. 2000, pp. 1468–1470.

Mahdi et al., "Long–Wavelength–Band $Er^{3+}$–Doped Fiber Amplifier Incorporating a Ring–Laser as a Seed Signal Generator", IEEE Journal on Selected Topics in Quantum Electronics, vol. 7, No. 1, Jan./Feb. 2001, pp. 59–63.

Mahdi et al., "Effects of signal seeding on long–wavelength–band $Er^{3+}$–doped fiber amplifiers", Optical Engineering, vol. 40, No. 2, Feb. 2001, pp. 186–192.

Adikan et al., "Novel, Gain–Flattened L–Band with ASE Utilization with >40 nm 3 dB Bandwidth", Microwave and Optical Technology Letters, vol. 28, No. 6, Mar. 20, 2001, pp. 399–402.

Bennett, "Expanding Technologies Boost Available Bandwidth", Laser Focus World—Optoelectronics and Laser Technology Advances, Apr. 13, 2001.

Mahdi, "Low–noise and high–gain L–bank EDFA utilising a novel self–generated signal–seeding technique", Optics Communications 195 (2001) Elsevier Science B.V., pp. 241–248.

Mahdi et al, "Gain Enhanced L–Band $Er^{3+}$–Doped Fiber Amplifier Utilizing Unwanted Backward ASE", IEEE Photonics Technology Letters, vol. 13, No. 10, Oct. 2001, pp. 1067–1069.

Yeniay et al, "L–Band EDFA Gain and Gain Flatness Enhancement via Co–Propagating C–Band Seed Technique", Pre–Publication Versions, Published Sep., 2001, pp 1–3 USA.

Mao et al, "Amplification Enhancement of L–Band Erbium–Doped Fiber Amplifiers by Reflection Scheme", Optics Communications, Jan. 1, 2002, pp. 61–69.

Zhang et al, "Wavelength and Power Dependence of Injected C–Band Laser on Pump Conversion Efficiency of L–Band EDFA", IEEE Photonics Technology Letters, vol. 14 No. 3, Mar. 2002, pp. 290–292.

Harun et al, "Gain Clamping in L–Band Erbium–Doped Fiber Amplifier Using a Fiber Bragg Grating", IEEE Photonics Technology Letters, vol. 14, No. 3, Mar. 2002, pp. 293–295.

Harun et al, "Gain Enhancement in L–Band EDFA Through a Double–Pass Technique", IEEE Photonics Technology Letters, vol. 14, No. 3, Mar. 2002, pp 296–297.

PCT International Search Report, mailed Feb. 10, 2003.

Sun Y. et al, "80 nm Ultra–Wideband Erbium–Doped Silica Fibre Amplifer", Electronics Letters, IEE Stevenage, GB vol. 33, No. 23, Nov. 6, 1997, pp 1965–1967.

Nilsson J. et al, "Long–Wavelength Erbium–Doped Fiber Amplifier Gain Enhanced by ASE End–Reflectors", IEEE Photonics Technology Letters, IEEE Inc. New York, U.S. vol. 10, No. 11, Nov. 1998, pp 1551–1553.

Massicot J. F. et al, "High Gain, Broadband, 1.6M ER3+ Doped Silica Fibre Amplifier", Electronics Letters, IEE Stevenage, GB vol. 26, No 20, Sep. 27, 1990, pp 1645–1646.

* cited by examiner

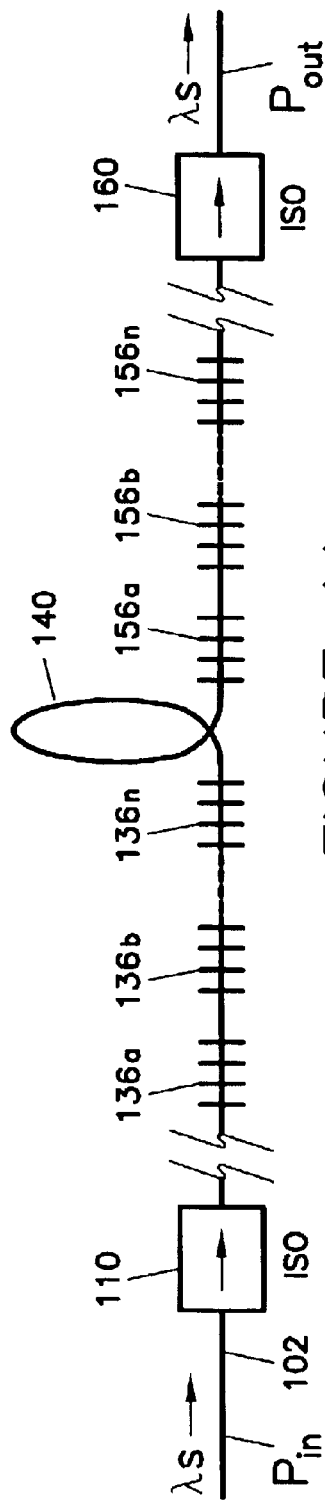
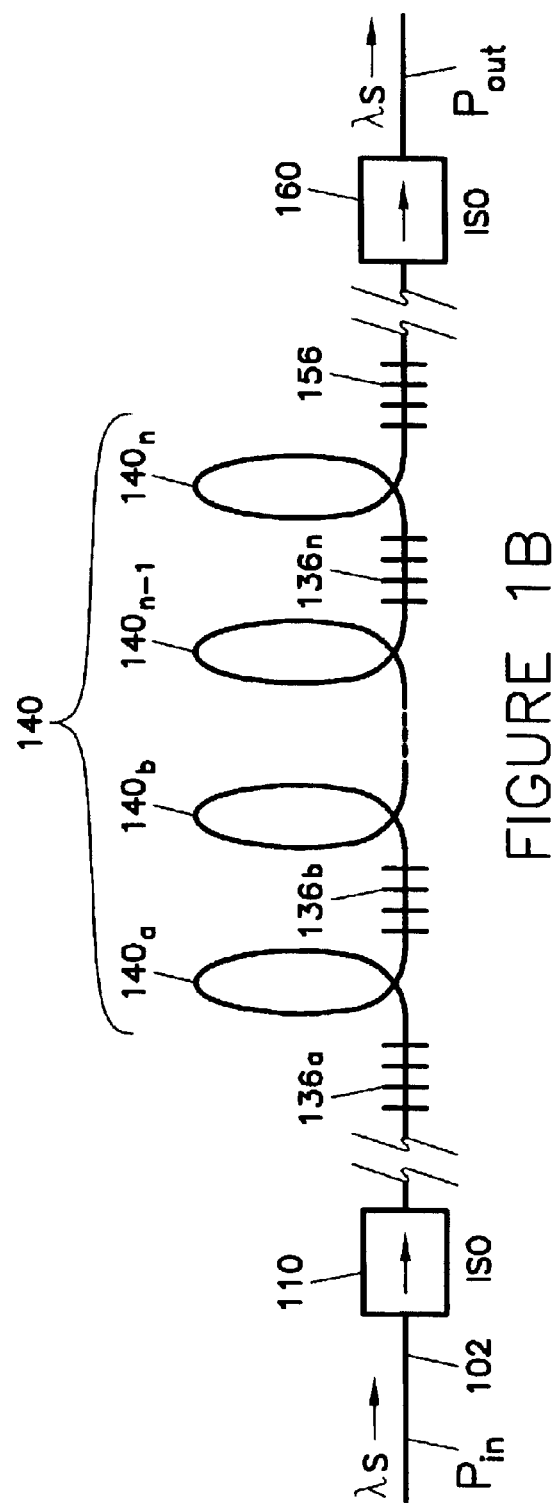
FIGURE 1A
FIGURE 1B

Single and Dual Stage L-Band EDFA comparison in terms of $P_{in}$ vs. $P_{out}$ C-band seeds; First stage:1558nm, Second stage;1560nm and 1555nm

LONG WAVELENGTH OPTICAL AMPLIFIER

CROSS-REFERENCE TO RELATED APPLICATION

The present application claims the benefit of U.S. Provisional Application No. 60/325,641, filed Sep. 28, 2001.

FIELD OF THE INVENTION

The present invention relates to optical amplifiers having operating wavelengths longer than main emission peak wavelengths, and more particularly to erbium doped fiber and waveguide amplifiers operating in the long wavelength regime (1560–1620 nm), especially for wavelength division multiplexing (WDM) applications.

BACKGROUND OF THE INVENTION

Conventional erbium doped fiber amplifiers (EDFA) have been extensively used in optical telecommunications as means to amplify weak optical signals in the third telecommunication window (near 1550 nm) between telecommunication links. Much work has been done on the design of these amplifiers to provide efficient performance, such as high optical gain and low noise figure. However, with the recent enormous growth of data traffic in telecommunications, owing to the Internet, intranets, and e-commerce, new optical transmission bandwidths are required to provide increased transmission capacity in dense wavelength division multiplexing (DWDM) systems.

There are a few solutions to this demand. One proposed solution is to utilize new materials compositions as a host for the fiber gain medium (instead of silica) such as telluride, which may provide broader amplification bandwidth (up to 80 nm). However, the non-uniform gain shape and poor mechanical properties of telluride glass make these amplifiers difficult to implement in the telecom systems. Also, Raman amplifiers can be considered as an alternative solution to high bandwidth demand, since these amplifiers are capable of providing flexible amplification wavelength with a broad bandwidth. However, these amplifiers place restrictions on optical system architectures because of their required designs for efficient performance, such as long fiber length (>5 km), high pump power (>500 mW) and co-pumping configurations. On the other hand, relatively long erbium doped fibers (EDFs) may also provide amplification in the long wavelength range (1565–1625 nm) when they are used with high power pump sources. This range is commonly called "L band". The conventional range, also known as "C band" is in the wavelength range between 1525–1565 nm.

In principle, L band amplifiers take advantage of the fact that EDFs have a higher emission cross-section than absorption cross-section at longer wavelengths. Therefore, for long EDFs, amplified spontaneous emission (ASE) becomes more emphasized at long wavelengths. However, there are still several issues for optimization of L band amplifiers for efficient performance. So far, reported performance of L band EDFAs has been inferior to that of C band EDFAs, with drawbacks as evidenced by higher noise figure (NF) and lower output power and gain.

European Patent Application EP 0954070 A2 to Terahara et al. discloses an optical amplifier that uses both co-pumping and counter-pumping of a gain medium, with 1550 nm ASE reflectors on either side of the gain medium, which reflect the ASE being transmitted from the gain medium back into the gain medium. However, such an arrangement promotes a lasing effect, which produces a gain clamped amplifier, limiting the achievable gain of the amplifier.

It would be beneficial to provide an L band amplifier with a low noise figure and high output power and gain.

BRIEF SUMMARY OF THE INVENTION

Briefly, the present invention provides an L band optical amplifier. The amplifier includes a signal line for transmitting a signal light in a first direction. The signal line includes an input, an output disposed optically downstream of the input, and a first amplifying gain medium optically disposed between the input and the output. A first laser is optically aligned with the first amplifying gain medium to transmit a first pump light to the first amplifying gain medium toward the output. A first reflector is disposed along the signal line between the first amplifying gain medium and the output to reflect a first bandwidth of light from the first amplifying gain medium back into the first amplifying gain medium. A second laser is optically aligned with the first amplifying gain medium to transmit a second pump light to the first amplifying gain medium toward the input. A second is reflector disposed along the signal line between the first amplifying gain medium and the input to reflect a second bandwidth of light, different from the first bandwidth of light, from the first amplifying gain medium back into the first amplifying gain medium.

Additionally, the present invention provides a method of amplifying a light signal. The method comprises amplifying an L band optical signal comprising transmitting an L band optical signal through an amplifying gain medium in a first direction; transmitting a first pump signal into the amplifying gain medium in the first direction; transmitting a second pump signal into the amplifying gain medium in a second direction, opposite the first direction, wherein the first and second pump signals amplify the L band optical signal by a first amount and generate amplified spontaneous emission in the amplified gain medium, wherein the amplified spontaneous emission is transmitted from the amplifying gain medium in each of the first and second directions; reflecting a first bandwidth of the amplified spontaneous emission from the first direction to the second direction and back into the amplifying gain medium; and reflecting a second bandwidth of the amplified spontaneous emission, different from the first bandwidth, from the second direction to the first direction and back into the amplifying gain medium, wherein the reflected first and second bandwidths further amplify the L band signal by a second amount in the amplifying gain medium.

Further, the present invention provides an L band optical amplifier comprising a signal line for transmitting a signal light in a first direction. The signal line includes an input, an output disposed optically downstream of the input, and a first amplifying gain medium optically disposed between the input and the output. A first laser is optically aligned with the first amplifying gain medium to transmit a first pump light to the first amplifying gain medium toward the output. A first reflector is disposed along the first amplifying gain medium to reflect a first bandwidth of light from the first amplifying gain medium back into the first amplifying gain medium. A second laser is optically aligned with the first amplifying gain medium to transmit a second pump light to the first amplifying gain medium toward the input. A second reflector is disposed along the first amplifying gain medium to reflect a second bandwidth of light, different from the first bandwidth of light, from the first amplifying gain medium back into the first amplifying gain medium.

Also, the present invention provides an L band optical amplifier comprising a signal line for transmitting a signal light in a first direction. The signal line includes an input, an output disposed optically downstream of the input, and an amplifying gain medium optically disposed between the input and the output. A laser is optically aligned with the first amplifying gain medium to transmit a pump light to the amplifying gain medium toward the input. A reflector is disposed between the first amplifying gain medium and the output to reflect a bandwidth of light from the amplifying gain medium back into the amplifying gain medium.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 1A is a schematic drawing of an L band amplifier having multiple reflectors on either side of the amplifying gain medium according to an alternate version of the first embodiment of the present invention.

FIG. 1B is a schematic drawing of an L band amplifier having multiple reflectors along the length of the amplifying gain medium according to an alternate version of the first embodiment of the present invention.

DETAILED DESCRIPTION OF THE INVENTION

Figure 1:
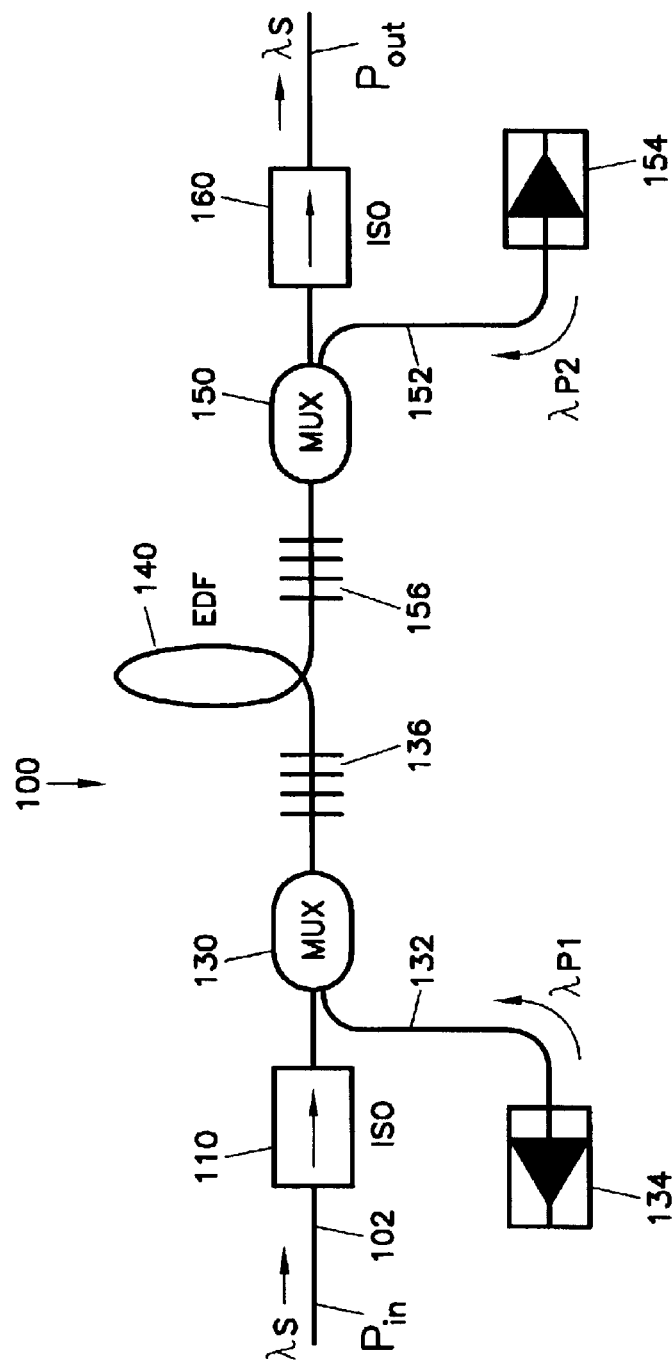
FIG. 1 is a schematic drawing of an L band amplifier according to a first embodiment of the present invention.

In the drawings, like numerals indicate like elements throughout. The present invention provides novel techniques and arrangements for improving the performance of L band EDFAs. In general, the present invention utilizes ASE in the C band to provide additional amplification capability in the amplifier. The ASE is generated during signal amplification by a conventional pump laser as a supplemental pump source for L band amplification or by a separate C band seed pump.

FIG. 1 shows a schematic drawing of an L band amplifier 100 according to a first embodiment of the present invention. The amplifier 100 includes a signal line 102 which extends from an input $P_{in}$ at one end of the amplifier 100 to an output $P_{out}$ at another end of the amplifier 100. Preferably, the signal line 102 is constructed from a polymer, and more preferably, from a perfluoropolymer, although those skilled in the art will recognize that the signal line 102 can be a glass or other light transmitting medium, including a waveguide. The input $P_{in}$ and the output $P_{out}$ are optically aligned with each other along the signal line 102 through the amplifier 100. Components are defined to be optically aligned when light signals can be transmitted between those components. Signal light $\lambda_S$ having at least one, and preferably, multiple wavelengths is transmitted through the amplifier 100 from the input $P_{in}$ to the output $P_{out}$, from left to right as shown in FIG. 1. The wavelengths of the signal light $\lambda_S$ preferably range approximately from 1565 to 1625 nanometers, placing the signal light $\lambda_S$ in the L band. Those skilled in the art will recognize that the signal line 102 can be a fiber, a waveguide, or other light transmitting device.

A first optical isolator 110 is optically disposed in the signal line 102 between the input $P_{in}$ and the output $P_{out}$. The first optical isolator 110 prevents backscattered light and other optical noise from traveling backward along the signal line 102, from the first optical isolator 110 toward the input $P_{in}$. A first pump-signal multiplexer 130 is disposed along the signal line 102 optically downstream of the first optical isolator 110. As used herein, the term "optically downstream" is defined to mean a direction along the signal line 102 from the input $P_{in}$ toward the output $P_{out}$. The first pump-signal multiplexer 130 optically couples a first pump laser 134 to the signal line 102 via a first pigtail 132. Preferably, the first pump laser 134 is a 980 or a 1480 nanometer laser which emits a first pump signal $\lambda_{P1}$, although those skilled in the art will recognize that other wavelengths can be used as well. Also preferably, the first pump laser 134 has an output power of at least 100 mW, although those skilled in the art will recognize that the first pump laser 134 can have other output powers as well. Although the first pump laser 134 is preferred to optically connect via the first pigtail 132 to the first pump-signal multiplexer 130, those skilled in the art will recognize that other optical connection techniques, such as free space coupling, can be used instead.

A rare earth doped amplifying gain medium 140, such as an erbium doped fiber (EDF) is disposed along the signal line 102 optically downstream of the first pump-signal multiplexer 130. Preferably, the rare earth is erbium, although those skilled in the art will recognize that other elements, including, but not limited to lanthanum, cerium, praseodymium, neodymium, promethium, samarium, europium, gadolinium, terbium, dysprosium, holmium, thulium, ytterbium, lutetium, and combinations and blends thereof can be used. Although the amplifying gain medium 140 does not have a minimum or maximum length, those skilled in the art will recognize that the length of the amplifying gain medium 140 can be varied, in conjunction with different output powers of the first pump laser 134, to provide different amplification gains and/or output powers. While the amplifying gain medium 140 is preferably a fiber, those skilled in the art will recognize that the amplifying gain medium 140 can also be a waveguide or other light transmitting device.

A first reflector 136 is optically disposed in the signal line 102 between the first optical isolator 110 and the amplifying gain medium 140. Preferably, the first reflector 136 is an FBG, although those skilled in the art will recognize that other types of reflectors can be used. The first reflector 136 reflects a small bandwidth of light travelling in a backward direction, from the amplifying gain medium 140 toward the first pump-signal multiplexer 130, back into the amplifying gain medium 140. Preferably, the bandwidth is only approximately 0.2 nanometers, around 1560 nanometers.

A second pump-signal multiplexer 150 is disposed along the signal line 102 optically downstream of the amplifying gain medium 140. The second pump-signal multiplexer 150 optically couples a second pump laser 154 to the signal line 102 via a second pigtail 152. Preferably, the second pump laser 154 is a 980 or a 1480 nanometer laser which emits a second pump signal $\lambda_{P2}$, although those skilled in the art will recognize that other wavelengths can be used as well. Also preferably, the second pump laser 154 has an output power of at least 100 mW, although those skilled in the art will recognize that the second pump laser 154 can have other output powers as well. Although the second pump laser 154 is preferred to optically connect via the second pigtail 152 to the second pump-signal multiplexer 150, those skilled in the art will recognize that other optical connection techniques, such as free space coupling, can be used instead.

A second reflector 156 is optically disposed in the signal line 102 between the amplifying gain medium 140 and the second pump-signal multiplexer 150. Preferably, the second reflector 156 is a Fiber Bragg Grating (FBG), although those skilled in the art will recognize that other types of reflectors can be used. The second reflector 156 reflects a small bandwidth of light travelling in a forward direction, from the amplifying gain medium 140 toward the second pump-signal multiplexer 150, back into the amplifying gain medium 140. Preferably, the bandwidth is only approximately 0.2 nanometers, around 1535 nanometers.

It is important that the second reflector 156 reflects a different bandwidth than the first reflector 136 because otherwise, a lasing effect is generated, producing a gain clamped amplifier that limits the amount of the gain that can be achieved by the amplifier 100. Although, in the embodiment described, the reflective wavelength of the first and second reflectors 136, 156 differs by approximately 25 nanometers, those skilled in the art will recognize that the reflective wavelength can be closer, with reflective wavelengths differing by as little as 6–10 nanometers, without causing destructive interference or lasing.

A second optical isolator 160 is disposed along the signal line 102 optically downstream of the second pump-signal multiplexer 150. The second optical isolator 160 prevents backscattered light and other optical noise from traveling backward along the signal line 102, from the second optical isolator 160 toward the amplifying gain medium 140. The second optical isolator 160 is optically aligned with the output $P_{out}$ of the amplifier 100.

The devices described above, including the optical isolators 110, 160, the multiplexers 120, 130, amplifying gain medium 140, and the pump lasers 134, 154 can also be used in amplifying C band signals. Further, although described and shown as separate components, the optical isolators 110, 160, the multiplexers 120, 130, the reflectors 136, 156, and the amplifying gain medium 140 can all be integrated into a single planar optical waveguide chip, greatly decreasing the size of the amplifier 100 over conventional amplifiers.

In operation, the signal light $\lambda_S$ having a wavelength band of approximately between 1565 and 1625 nanometers is inserted into the amplifier 100 in a first direction at the input $P_{in}$. The signal light $\lambda_S$ is transmitted along the signal line 102 to the first optical isolator 110. The signal light $\lambda_S$ passes through the first optical isolator 110 and along the signal line 102 to the pump-signal multiplexer 130.

The first pump laser 134 transmits a first 980 or a 1480 nanometer pump light $>>_{P1}$ along the first pump laser guide 132 to the first pump-signal multiplexer 130. At the first pump-signal multiplexer 130, the signal light $\lambda_S$ is combined with the first pump light $\lambda_{P1}$ emitted by the first pump laser 134. The combined signal light $\lambda_S$ and the first pump light $\lambda_{P1}$ are transmitted to the amplifying gain medium 140. The first pump light $\lambda_{P1}$ excites the rare earth element in the amplifying gain medium 140, amplifying the signal light $\lambda_S$, as is well known in the art. The amplified signal light $\lambda_S$ is then transmitted from the amplifying gain medium 140, through the second pump-signal multiplexer 150, the second optical isolator 160, and to the output $P_{out}$.

However, as the signal light $\lambda_S$ is transmitted through the amplifying gain medium 140, first ASE, which travels in both forward and backward directions relative to the signal light $\lambda_S$, is generated. Both backward and forward first ASE light for an L band signal is generated in the C band, with wavelengths of approximately between 1525 and 1565 nanometers. The backward first ASE travels in a second, opposite direction from the signal light $\lambda_S$, toward the input $P_{in}$. The backward first ASE travels toward the first pump-signal multiplexer 130. However, backward first ASE having wavelengths around 1560 nanometers is reflected by the first reflector 136 back into the amplifying gain medium 140. The forward first ASE travels in the first, same direction as the signal light $\lambda_S$, toward the output $P_{out}$. The forward first ASE travels toward the second pump-signal multiplexer 150. However, forward first ASE having wavelengths around 1535 nanometers is reflected by the second reflector 156 back into the amplifying gain medium 140.

Since the reflected first ASE is in the C band range, the reflected backward and forward first ASE acts as a supplemental pump source, increasing the amplification capacity of the amplifier 100 in the L band range. The reflected backward and forward first ASE has sufficient energy and proper wavelengths to pump the signal light $\lambda_S$ in manner similar to the first pump laser 134. After amplification by the first pump laser 134 and by the reflected backward and forward first ASE, the signal light $\lambda_S$ has an amplified intensity, larger than the initial intensity.

Generally simultaneously, the second pump laser 154 transmits a second 980 or a 1480 nanometer pump light $\lambda_{P2}$ along the second pump laser guide 152 to the second pump-signal multiplexer 150 and in a backward direction along the signal line 102 to the amplifying gain medium 140. The second pump light $\lambda_{P2}$ excites the rare earth element in the amplifying gain medium 140, amplifying the signal light $\lambda_S$, as is well known in the art.

However, as the signal light $\lambda_S$ is transmitted through the amplifying gain medium 140, backward and forward second ASE, which travels in both forward and backward directions relative to the signal light $\lambda_S$, is generated. Forward and backward second ASE light for an L band signal is generated in the C band, with wavelengths of approximately between 1525 and 1565 nanometers. The forward second ASE travels in the first direction with the signal light $\lambda_S$, toward the output $P_{out}$. The forward second ASE travels toward the second pump-signal multiplexer 150. However, forward second ASE having wavelengths around 1535 nanometers is reflected by the second reflector 156 back into the amplifying gain medium 140. The first backward ASE, having been reflected by the first reflector 136 and traveled through the amplifying gain medium 140, is not reflected by the second reflector 156 and is allowed to travel along the signal line 102 toward the output $P_{out}$. Such an arrangement eliminates the potential for lasing, which would limit the gain and potentially have other deleterious effects on the amplifier 100. Similarly, the forward second ASE, having been reflected by the second reflector 156 and traveled through the amplifying gain medium 140, is not reflected by the first reflector 136 and is allowed to travel along the signal line 102 toward the input $P_{in}$, where the reflected forward second ASE is absorbed by the first isolator 110.

Since the reflected first and second ASE is in the C band range, the reflected first and second ASE both act as a supplemental pump source, increasing the amplification capacity of the amplifier 100 in the L band range. The reflected first and second ASE both have sufficient energy and proper wavelengths to pump the signal light $\lambda_S$ in manner similar to each of the first and second pump lasers 134, 154. After amplification by the first and second pump lasers 134, 154 and by the reflected first and second ASE, the signal light $\lambda_S$ has an amplified intensity, larger than the initial intensity.

Figure 2:
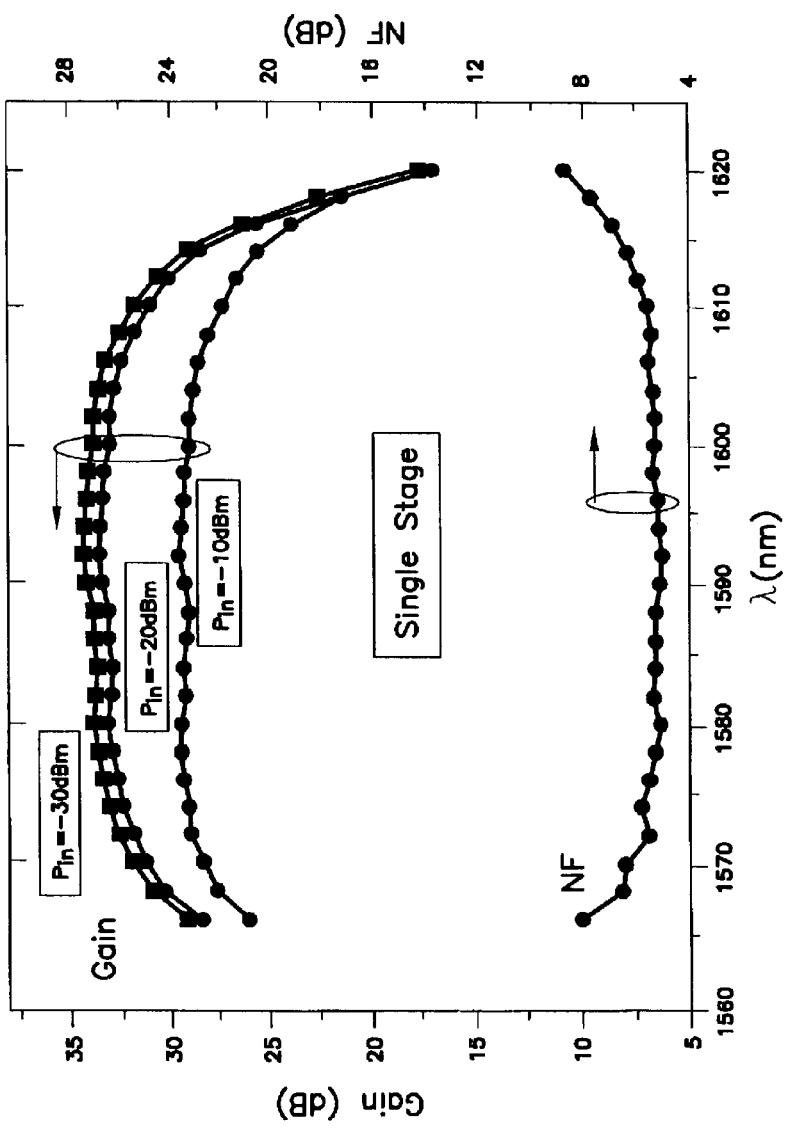
FIG. 2 is a graph showing calculated gain and noise figures vs. L band wavelengths at various input powers.

FIG. 2 shows a graph of measured wavelength vs. gain and noise figure for L band light between 1565 and 1620 nanometers for the amplifier 100 according to the first preferred embodiment of the present invention. As shown in FIG. 2, gain increase is as much as 34 dB, while the noise figure is less than 9 dB.

An alternate version of the first embodiment of the amplifier 100 is shown in FIG. 1A. Instead of a single reflector 136, 156 on either side of the amplifying gain medium 140, a plurality of reflectors 136a, 136b, . . . 136n can be disposed along the signal line 102 between the first optical isolator 110 and the amplifying gain medium 140, and a further plurality of reflectors 156a, 156b, . . . 156n can be disposed along the signal line 102 between the amplifying gain medium 140 and the second optical isolator 160.

Each of the plurality of reflectors 136a, 136b, . . . 136n, 156a, 156b, . . . 156n reflects a different bandwidth of the C-band ASE generated in the amplifying gain medium 140. Preferably, none of the reflectors 136a, 136b, . . 136n, 156a, 156b, . . . 156n reflect a bandwidth of the ASE that differs from the reflective bandwidth of another reflector 136a, 136b, . . . 136n, 156a, 156b, . . . 156n by less than approximately 2 nanometers, so as not to develop a lasing effect.

FIG. 1B shows a second alternate version of the first embodiment of the optical amplifier 100 in which a plurality of reflectors 136a, 136b, . . . 136n, 156 are disposed along the amplifying gain medium 140, which is shown broken up into n segments 140a, 14b, . . . . 140n, with a reflector 136b, . . . 136n, 156 disposed on either side of each of the segments 140a, 14b, . . . 140n. As described above with reference to FIG. 1B, preferably, none of the reflectors 136a, 136b, . . . 136n, 156 reflect a bandwidth of the ASE that differs from the reflective bandwidth of another reflector 136a, 136b, . . . 136n, 156 by less than approximately 2 nanometers, so as not to develop a lasing effect. Those skilled in the art will recognize that the reflectors 136, 156 need not be disposed on either side of the amplifying gain medium 140 as shown, but can also be disposed along the amplifying gain medium 140.

Figure 3:
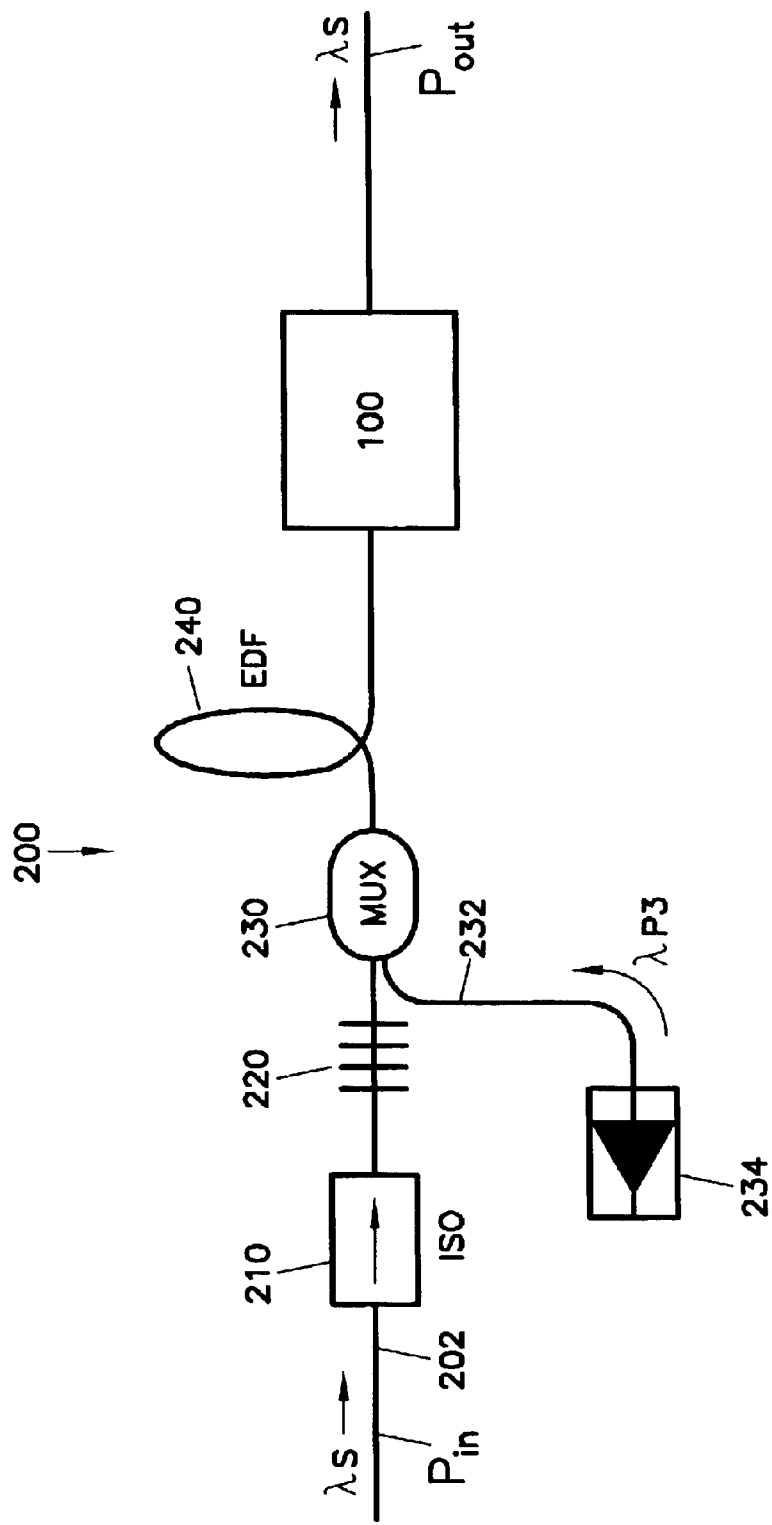
FIG. 3 is a schematic drawing of an L band amplifier according to a second embodiment of the present invention.

A second embodiment of an L band amplifier 200 according to the present invention is shown schematically in FIG. 3. The amplifier 200 includes a signal line 202 which extends from an input $P_{in}$ at one end of the amplifier 200 to an output $P_{out}$ at another end of the amplifier 200. The input $P_{in}$ and the output $P_{out}$ are optically connected to each other along the signal line 202 through the amplifier 200. Signal light $\lambda_S$ having at least one, and preferably, multiple wavelengths is transmitted through the amplifier 200 from the input $P_{in}$ to the output $P_{out}$, from left to right as shown in FIG. 3. The wavelengths of the signal light $\lambda_S$ preferably range approximately from 1565 to 1625 nanometers, placing the signal light $\lambda_S$ in the L band.

A third optical isolator 210 is optically disposed in the signal line 202 between the input $P_{in}$, and the output $P_{out}$. The third optical isolator 210 prevents backscattered light and other optical noise from traveling backward along the signal line 202, from the third optical isolator 210 toward the input $P_{in}$. A third pump-signal multiplexer 230 is disposed along the signal line 202 optically downstream of the third optical isolator 210. The third pump-signal multiplexer 230 couples a first end of a third pump laser guide 232 to the signal line 202. A second end of the pump third laser guide 232 is connected to a third pump laser 234. Preferably, the third pump laser 234 is a 980 nanometer laser which emits a third pump signal $\lambda_{P3}$, although those skilled in the art will recognize that other wavelengths can be used as well. Also preferably, the third pump laser 234 has an output power of at least 100 mW, although those skilled in the art will recognize that the third pump laser 234 can have other output powers as well.

A second rare earth doped amplifying gain medium 240 is optically disposed along the signal line 202 optically downstream of the third pump-signal multiplexer 230. Although the second amplifying gain medium 240 does not have a minimum or maximum length, those skilled in the art will recognize that the length of the amplifying gain medium 240 can be varied, in conjunction with different output powers of the third pump laser 234, to provide different amplification gains and/or output powers.

A third reflector 220 is optically disposed in the signal line 202 between the third optical isolator 210 and the second amplifying gain medium 240. Preferably, the third reflector 220 is an FBG, although those skilled in the art will recognize that other types of reflectors can be used. The third reflector 220 reflects a small bandwidth of light traveling in a backward direction, from the second amplifying gain medium 240 toward the third pump-signal multiplexer 230, back into the second amplifying gain medium 240. Preferably, the bandwidth is only approximately 0.2 nanometers, around 1558 nanometers.

It is important that the third reflector 220 reflect a different bandwidth than the second reflector 156 because, if the bandwidth of the second and third reflectors 156, 220 were the same, or differed by less than about 6–10 nanometers, a lasing effect as described above could develop, limiting the gain of the amplifier 200.

The optical amplifier 100 as described above is optically connected to the output of the second amplifying gain medium 240, so that the signal light $\lambda_S$ and the third pump light $\lambda_{P3}$ can travel from the second amplifying gain medium 240 to the input $P_{in}$ of the optical amplifier 100.

In operation, the signal light $\lambda_S$ having a wavelength band of approximately between 1565 and 1625 nanometers is injected into the amplifier 200 in a first direction at the input $P_{in}$. The signal light $\lambda_S$ is transmitted along the signal line 202 to the third optical isolator 210. The signal light $\lambda_S$ passes through the third optical isolator 210 and along the signal line 202 to the third pump-signal multiplexer 230.

The pump laser 234 transmits a 980 nanometer pump signal $\lambda_{P3}$ along the third pump laser guide 232 to the third pump-signal multiplexer 230. At the third pump-signal multiplexer 230, the signal light $\lambda_S$ is combined with the third pump light $\lambda_{P3}$ emitted by the third pump laser 234. The combined signal light $\lambda_S$ and the pump light $\lambda_{P3}$ are transmitted to the second amplifying gain medium 240. The third pump signal $\lambda_{P3}$ excites the rare earth element in the second amplifying gain medium 240, amplifying the signal light $\lambda_S$.

However, as the signal light $\lambda_S$ is transmitted through the second amplifying gain medium 240, third forward and backward ASE, which travels in both forward and backward directions relative to the signal light $\lambda_S$, is generated. The third backward ASE travels in a second, opposite direction from the signal light $\lambda_S$, toward the input $P_{in}$. The third backward ASE travels through the pump-signal multiplexer 230 and to the third reflector 220. At the third reflector 220, C band light in the form of the third backward ASE having a bandwidth of approximately 1558 nanometers is reflected by the third reflector 220 and back into the second amplifying gain medium 240 so that the reflected third backward ASE acts as a supplemental pump source to further increase the gain of the signal light $\lambda_S$.

The signal light $\lambda_S$, now amplified by the first amplifying gain portion 240, is transmitted to the first amplifying gain medium 140, where the signal light $\lambda_S$ is further amplified as described above with respect to the first embodiment amplifier 100.

Figure 4:
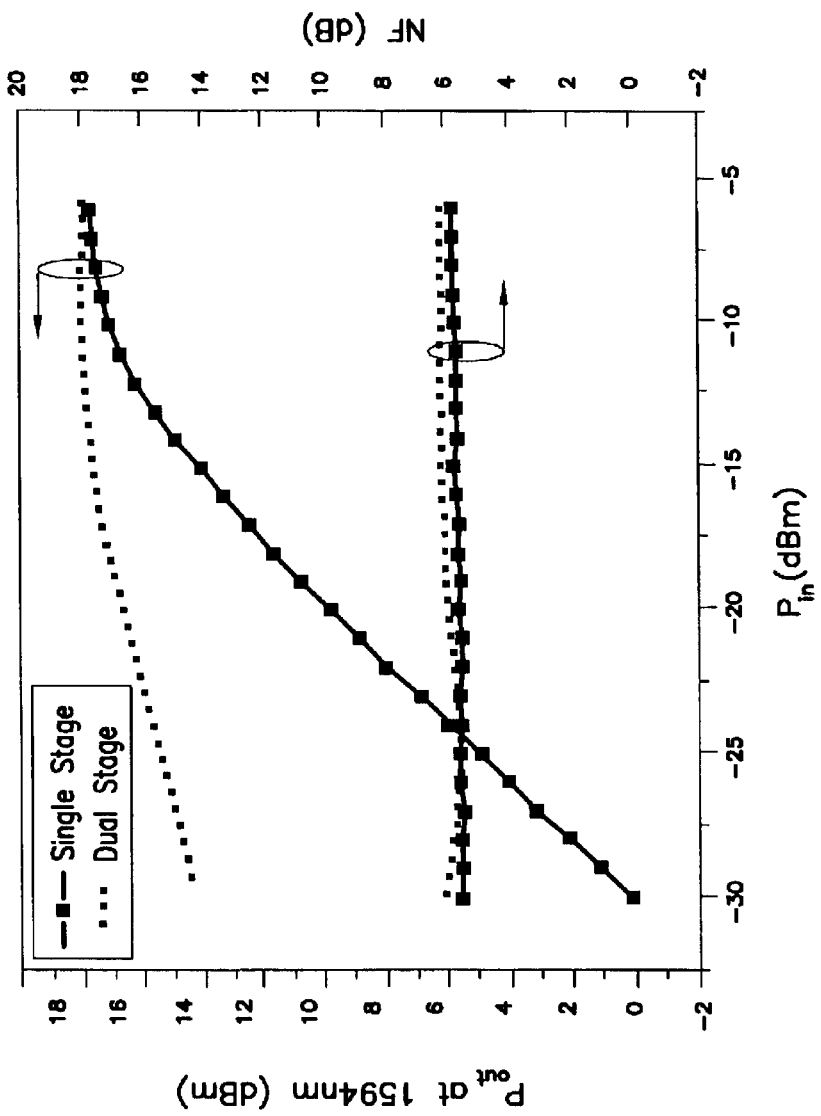
FIG. 4 is a graph showing measured output power and noise figures vs. input power for a prior art single stage amplifier and the second embodiment of the present invention.

FIG. 4 shows a graph of measured input power vs. output power and noise for a 1594 nanometer signal for a prior art optical single stage amplifier (not shown) as compared to the amplifier 200. As can be seen from FIG. 4, the optical amplifier 200 provides significantly increased power output for low power input than the prior art single stage amplifier, with both the amplifier 200 and the prior art single stage amplifier generating a generally constant noise level throughout the power range shown.

Although the embodiments described above are generally referred to as having several individual components, those skilled in the art will recognize that components such as amplifying media, optical isolators, multiplexers, and reflectors can be incorporated into a single or several planar waveguides.

Although reflectors 136, 156, 220 are preferred to direct ASE into the amplifying gain media 140, 240, those skilled in the art will recognize that other structures, such as those disclosed in co-pending U.S. patent application Ser. Nos. 09/888,880 and 09/888,881, both filed on Jun. 25, 2001, which are both owned by the assignee of the present invention and are incorporated herein in their entireties, can be used instead of, or in addition to, the reflectors 136, 156, 220.

Further, although the second and third reflectors 156 and 220 are illustrated as having reflection bandwidths around 1535 and 1558 nanometers, respectively, those skilled in the art will recognize that the reflection bandwidths can be other values less than 1560 nanometers, preferably between approximately 1535 and 1560 nanometers.

Figure 5:
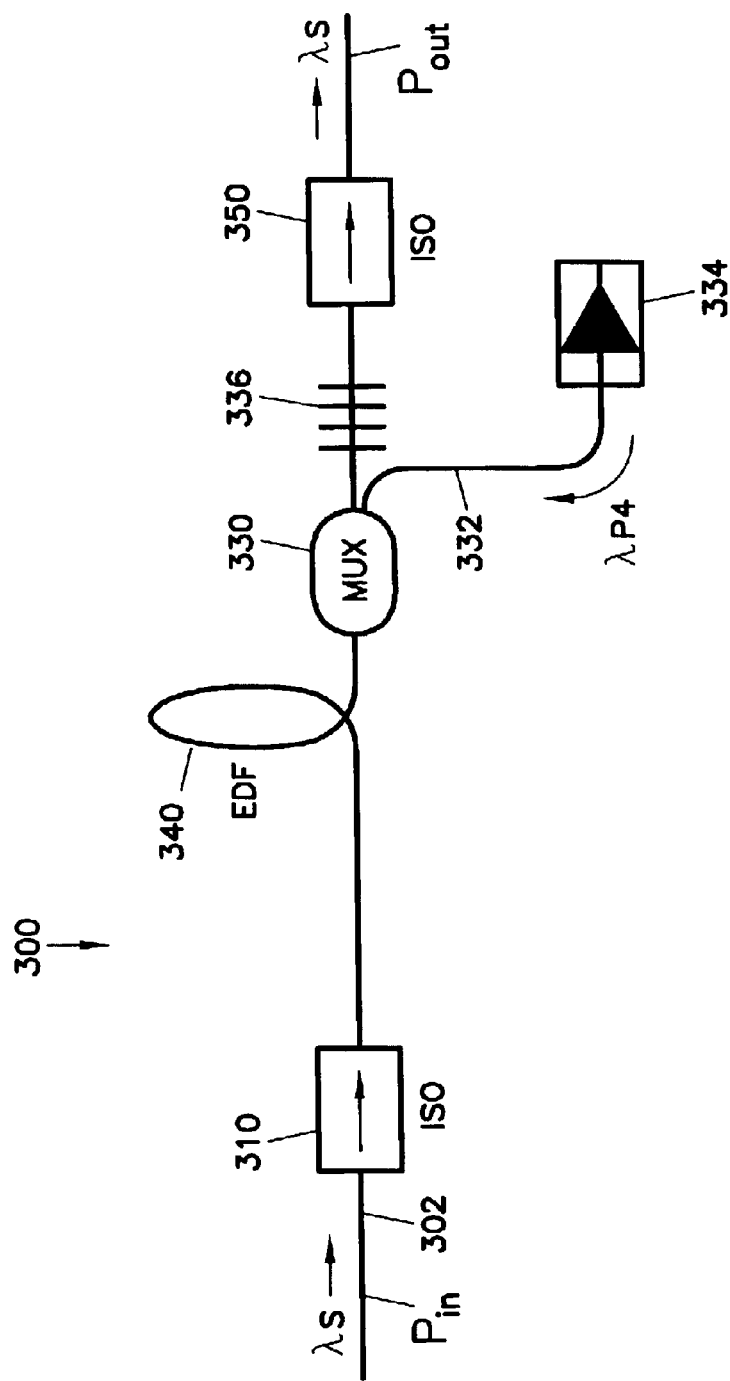
FIG. 5 is a schematic drawing of an L band amplifier according to a third embodiment of the present invention.

A third embodiment of an L band optical amplifier 300 according to the present invention is shown schematically in FIG. 5. The amplifier 300 includes a signal line 302 which extends from an input $P_{in}$ at one end of the amplifier 300 to an output $P_{out}$ at another end of the amplifier 300. The input $P_{in}$ and the output $P_{out}$ are optically connected to each other along the signal line 302 through the amplifier 300. Signal light $\lambda_S$ having at least one, and preferably, multiple wavelengths is transmitted through the amplifier 300 from the input $P_{in}$ to the output $P_{out}$, from left to right as shown in FIG. 5. The wavelengths of the signal light $\lambda_S$ preferably range approximately from 1565 to 1625 nanometers, placing the signal light $\lambda_S$ in the L band.

A fourth optical isolator 310 is optically disposed in the signal line 302 between the input $P_{in}$ and the output $P_{out}$. The fourth optical isolator 310 prevents backscattered light and other optical noise from traveling backward along the signal line 202, from the fourth optical isolator 310 toward the input $P_{in}$.

A third rare earth doped amplifying gain medium 340 is optically disposed along the signal line 302 optically downstream of the fourth optical isolator 310. Although the third amplifying gain medium 340 does not have a minimum or maximum length, those skilled in the art will recognize that the length of the amplifying gain medium 340 can be varied.

A fourth pump-signal multiplexer 330 is disposed along the signal line 302 optically downstream of the third amplifying gain medium 340. The fourth pump-signal multiplexer 330 couples a first end of a fourth pump laser guide 332 to the signal line 302. A second end of the fourth pump laser guide 332 is connected to a fourth pump laser 334. Preferably, the fourth pump laser 334 is a 980 nanometer laser which emits a fourthpump signal $\lambda_{P4}$, although those skilled in the art will recognize that other wavelengths can be used as well. Also preferably, the fourth pump laser 234 has an output power of at least 100 mW, although those skilled in the art will recognize that the fourth pump laser 234 can have other output powers as well.

A fifth optical isolator 350 is optically disposed along the signal line 302 between the amplifying gain medium 340 and the output $P_{out}$. A fourth reflector 336 is optically disposed in the signal line 302 between the fourth optical isolator 310 and the third amplifying gain medium 340. Preferably, the fourth reflector 320 is an FBG, although those skilled in the art will recognize that other types of reflectors can be used. The fourth reflector 320 reflects a small bandwidth of light travelling in a forward direction, from the second amplifying gain medium 240 toward the output $P_{out}$, back into the second amplifying gain medium 240. Preferably, the bandwidth is only approximately 0.2 nanometers, around 1560 nanometers.

In operation, a signal light $\lambda_S$ having a wavelength band of approximately between 1565 and 1625 nanometers is inserted into the amplifier 300 in a first direction at the input $P_{in}$. The signal light $>>_S$ is transmitted along the signal line 302 to the fourth optical isolator 310. The signal light $\lambda_S$ passes through the fourth optical isolator 310 and along the signal line 302 to the amplifying gain medium 340.

The fourth pump laser 334 transmits a first 980 or a 1480 nanometer pump light $\lambda_{P4}$ along the fourth pump laser guide 332 to the fourth pump-signal multiplexer 330. The fourth pump light $\lambda_{P4}$ is transmitted to the third amplifying gain medium 340, which excites the rare earth element in the third amplifying gain medium 340, amplifying the signal light $\lambda_S$, as is well known in the art. The amplified signal light $\lambda_S$ is then transmitted from the amplifying gain medium 340, through the fourth pump-signal multiplexer 330, the fifth optical isolator 350, and to the output $P_{out}$.

However, as the signal light $>>_S$ is transmitted through the third amplifying gain medium 340, fourth ASE, which travels in both forward and backward directions relative to the signal light $\lambda_S$, is generated. Both backward and forward fourth ASE light for an L band signal is generated in the C band, with wavelengths of approximately between 1525 and 1565 nanometers. The backward fourth ASE travels in a second, opposite direction from the signal light $\lambda_S$, toward the input $P_{in}$. The forward fourth ASE travels in the first, same direction as the signal light $\lambda_S$, toward the output $P_{out}$. The forward fourth ASE travels toward the fourth pump-signal multiplexer 330. However, forward first ASE having wavelengths around 1560 nanometers is reflected by the fourth reflector 336 back into the amplifying gain medium 140.

Since the reflected fourth ASE is in the C band range, the reflected fourth ASE acts as a supplemental pump source, increasing the amplification capacity of the amplifier 300 in the L band range. The reflected fourth ASE has sufficient energy and proper wavelengths to pump the signal light $\lambda_S$ in manner similar to the fourth pump laser 334. After amplification by the fourth pump laser 334 and by the reflected fourth ASE, the signal light $\lambda_S$ has an amplified intensity, larger than the initial intensity.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An L band optical amplifier comprising:
   a signal line for transmitting a signal light in a first direction, the signal line including:
     an input;
     an output disposed optically downstream of the input; and
     a first amplifying gain medium optically disposed between the input and the output;
   a first laser optically aligned with the first amplifying gain medium to transmit a first pump light to the first amplifying gain medium toward the output;
   a first reflector disposed along the signal line between the first amplifying gain medium and the output to reflect a first bandwidth of light from the first amplifying gain medium back into the first amplifying gain medium;
   a second laser optically aligned with the first amplifying gain medium to transmit a second pump light to the first amplifying gain medium toward the input; and
   a second reflector disposed along the signal line between the first amplifying gain medium and the input to reflect a second bandwidth of light, different from the first bandwidth of light, from the first amplifying gain medium back into the first amplifying gain medium.

2. The L band optical amplifier according to claim 1, wherein the first bandwidth is C band light.

3. The L band optical amplifier according to claim 2, wherein the C band light is approximately 1555 nanometers.

4. The L band optical amplifier according to claim 1, wherein the second bandwidth is C band light.

5. The L band optical amplifier according to claim 4, wherein the C band light is approximately 1560 nanometers.

6. The L band optical amplifier according to claim 1, wherein the signal line further comprises an optical isolator optically disposed between the input and the first amplifying gain medium.

7. The L band optical amplifier according to claim 1, wherein the signal line further comprises an optical isolator optically disposed between the first amplifying gain medium and the output.

8. The L band optical amplifier according to claim 2, wherein the signal light experiences a gain of approximately 35 dB between the input and the output.

9. The L band optical amplifier according to claim 1, further comprising:
   a second amplifying gain medium optically disposed along the signal line between the input and the first amplifying gain medium;
   a third laser optically aligned with the second amplifying gain medium to transmit a third pump light to the second amplifying gain medium toward the input; and
   a third reflector disposed along the signal line between the second amplifying gain medium and the input to reflect a third bandwidth of light, different from each of the first and second bandwidths of light, from the second amplifying gain medium back into the second amplifying gain medium.

10. The L band optical amplifier according to claim 9, wherein the third pump laser transmits a third pump light of approximately 980 nanometer wavelength.

11. The L band optical amplifier according to claim 9, wherein the third bandwidth is C band light.

12. The L band optical amplifier according to claim 11, wherein the C band light is approximately 1558 nanometers.

13. The L band optical amplifier according to claim 1, wherein the amplifying gain medium is an erbium doped fiber.

14. The L band optical amplifier according to claim 1, wherein the amplifying gain medium is a planar optical waveguide.

15. The L band optical amplifier according to claim 1, wherein the first bandwidth of light and the second bandwidth of light are both C band light.

16. The L band optical amplifier according to claim 15, wherein the C band light is amplified spontaneous emission.

17. The L band optical amplifier according to claim 1, further comprising a plurality of reflectors disposed along the amplifying gain medium.

18. The L band optical amplifier according to claim 1, further comprising a plurality of reflectors optically disposed between the input and the amplifying gain medium.

19. The L band optical amplifier according to claim 1, further comprising a plurality of reflectors disposed between the amplifying gain medium and the output.

20. A method of amplifying an L band optical signal comprising:
   transmitting an L band optical signal through an amplifying gain medium in a first direction;
   transmitting a first pump signal into the amplifying gain medium in the first direction;
   transmitting a second pump signal into the amplifying gain medium in a second direction, opposite the first direction, wherein the first and second pump signals amplify the L band optical signal by a first amount and generate amplified spontaneous emission in the amplified gain medium, wherein the amplified spontaneous emission is transmitted from the amplifying gain medium in each of the first and second directions;
   reflecting a first bandwidth of the amplified spontaneous emission from the first direction to the second direction and back into the amplifying gain medium; and
   reflecting a second bandwidth of the amplified spontaneous emission, different from the first bandwidth, from the second direction to the first direction and back into the amplifying gain medium, wherein the reflected first and second bandwidths further amplify the L band signal by a second amount in the amplifying gain medium.

21. The method according to claim 20, wherein reflecting the second bandwidth comprises reflecting the second bandwidth differing from the first bandwidth by at least 6 nanometers.

22. The method according to claim 20, further comprising reflecting a third bandwidth of amplified spontaneous emission from the first direction to the second direction and back into the amplifying gain medium, wherein the third bandwidth differs from each of the first and second bandwidths by at least 6 nanometers.

23. An L band optical amplifier comprising:

a signal line for transmitting a signal light in a first direction, the signal line including:
- an input;
- an output disposed optically downstream of the input; and
- a first amplifying gain medium optically disposed between the input and the output;

a first laser optically aligned with the first amplifying gain medium to transmit a first pump light to the first amplifying gain medium toward the output;

a first reflector disposed along the first amplifying gain medium to reflect a first bandwidth of light from the first amplifying gain medium back into the first amplifying gain medium;

a second laser optically aligned with the first amplifying gain medium to transmit a second pump light to the first amplifying gain medium toward the input; and a second reflector disposed along the first amplifying gain medium to reflect a second bandwidth of light, different from the first bandwidth of light, from the first amplifying gain medium back into the first amplifying gain medium.

* * * * *